US012335356B2

(12) United States Patent
Chang et al.

(10) Patent No.: US 12,335,356 B2
(45) Date of Patent: Jun. 17, 2025

(54) TASK DISPATCHING METHOD AND SYSTEM FOR ELECTROPHORETIC DISPLAY (EPD) TAG DEVICES

(71) Applicant: ADVANTECH CO., LTD., Taipei (TW)

(72) Inventors: Chih-Cheng Chang, Taipei (TW); Feng-Hsiang Chung, Taipei (TW); Yi-Bin Yu, Taipei (TW)

(73) Assignee: ADVANTECH CO., LTD., Taipei (TW)

( * ) Notice: Subject to any disclaimer, the term of this patent is extended or adjusted under 35 U.S.C. 154(b) by 4 days.

(21) Appl. No.: 18/307,863

(22) Filed: Apr. 27, 2023

(65) Prior Publication Data

US 2024/0080376 A1 Mar. 7, 2024

(30) Foreign Application Priority Data

Jun. 24, 2022 (TW) .................. 111123744

(51) Int. Cl.
*H04L 67/63* (2022.01)
*G06Q 10/087* (2023.01)
*H04L 49/20* (2022.01)
(52) U.S. Cl.
CPC ........... *H04L 67/63* (2022.05); *G06Q 10/087* (2013.01); *H04L 49/20* (2013.01)

(58) Field of Classification Search
CPC ........ H04L 67/63; H04L 49/20; G06Q 10/087
See application file for complete search history.

(56) References Cited

U.S. PATENT DOCUMENTS

2013/0229260 A1* 9/2013 Huang .................... G06F 3/147
340/5.91
2014/0240333 A1* 8/2014 Shirota ................... G09G 5/02
345/531

\* cited by examiner

*Primary Examiner* — David R Lazaro
*Assistant Examiner* — Zia Khurshid
(74) *Attorney, Agent, or Firm* — The Webb Law Firm

(57) ABSTRACT

A task dispatching method for EPD tag devices includes receiving a task command; the server system forwarding the task command to a target router to which the target EPD tag device is connected; the target router checking whether the target EPD tag device is currently connected thereto; when it is determined that the target EPD tag device is not currently connected to the target router, the target router notifying the server system that the target EPD tag device is offline; in response to receiving an online notification indicating that the target EPD tag device is connected to another router, the server system updating a connection list accordingly, and forwarding the task command to an updated target router; and when it is determined that the target EPD tag device is currently connected to the target router, the target router delivering the task command to the target EPD tag device.

10 Claims, 6 Drawing Sheets

TASK DISPATCHING METHOD AND SYSTEM FOR ELECTROPHORETIC DISPLAY (EPD) TAG DEVICES

CROSS-REFERENCE TO RELATED APPLICATION

This application claims priority to Taiwanese Invention Patent Application No. 111123744, filed Jun. 24, 2022, the disclosure of which is hereby incorporated by reference in its entirety.

BACKGROUND

Field of the Disclosure

The disclosure relates to a method and a system for electrophoretic display (EPD) tag devices, and more particularly to a task dispatching method and system for the EPD tag devices.

Description of Related Art

With the development of Industry 4.0, ePaper devices are being used in warehouse management and have replaced traditional printed labels. Most ePaper devices use technologies of electrophoretic display (EPD), which has advantages of dirt resistance, abrasion resistance, water proof, and power saving, etc.

In the application of warehouse management, an EPD tag device may be mounted on a shelf or a container where products are stored to indicate, for example, a quantity of the products on the shelf or in the container. When the EPD tag device is connected to a router via a wireless network, a management system can dispatch a task (e.g., two products stored on the shelf will be picked) to the EPD tag device using the router, and would receive a report upon completion of the task (e.g., two products have been picked). Through this interaction, the quantity of the products, etc., can be effectively managed.

However, when the shelf or the container is moved, the EPD tag device may be moved out of the coverage of the router that the EPD tag device was originally connected to, and errors relating to the dispatched tasks may occur because of the loss of connection.

SUMMARY

Therefore, an object of the disclosure is to provide a task dispatching method for EPD tag devices that can alleviate at least one of the drawbacks of the prior art.

According to the disclosure, the task dispatching method is to be implemented by a server system and a plurality of routers connected to the server system. Each of the EPD tag devices is configured to be connected to one of the routers over a wireless network.

The method includes the following steps. In a step, the server system receives a task command that indicates a task and a target EPD tag device that is one of the EPD tag devices to which the task is assigned.

In another step, the server system forwards the task command to a target router that is one of the routers to which the target EPD tag device is connected and that is identified based on at least one connection list stored in the server system. Each of the at least one connection list records at least one of the routers and, for each of the at least one of the routers, one or more of the EPD tag devices connected to the router.

In yet another step, the target router checks whether the target EPD tag device is currently connected thereto, and in the negative, the target router notifies the server system that the target EPD tag device is offline by sending an offline notification to the server system.

In still another step, in response to receiving the offline notification from the target router and an online notification that indicates that the target EPD tag device is connected to another one of the routers, the server system updates the at least one connection list based on the offline notification and the online notification, and identifies the another one of the routers as the target router. Then, the server system repeats said another step and the target router repeats said yet another step. When it is determined that the target EPD tag device is currently connected to the target router, the target router delivers the task command to the target EPD tag device.

Another object of the disclosure is to provide a task dispatching system for electrophoretic display (EPD) tag devices. The task dispatching system includes a server system having at least one connection list stored therein, and a plurality of routers connected to the server system.

Each of the at least one connection list records at least one of the routers and, for each of the at least one of the routers, one or more of the EPD tag devices connected to the router.

The server system is configured to receive a task command that indicates a task and a target EPD tag device that is one of the EPD tag devices to which the task is assigned, and forward the task command to a target router that is one of the routers to which the target EPD tag device is connected and that is identified based on the at least one connection list.

The target router is configured to check whether the target EPD tag device is currently connected thereto, and notify the server system that the target EPD tag device is offline by sending an offline notification to the server system when it is determined that the target EPD tag device is not currently connected to the target router.

The server system is further configured to receive the offline notification from the target router and an online notification that indicates that the target EPD tag device is connected to another one of the routers, and to update the at least one connection list based on the offline notification and the online notification, the another one of the routers being identified as the target router. The server system is configured to once again forward the task command to the target router, and the target router is configured to once again check whether the target EPD tag device is currently connected thereto. The target router is further configured to deliver the task command to the target EPD tag device when it is determined that the target EPD tag device is currently connected thereto.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 1 is a block diagram illustrating an embodiment of a task dispatching system for the EPD tag devices according to the disclosure, wherein a target EPD tag device is connected to the router 2a.

DETAILED DESCRIPTION

Figure 1:
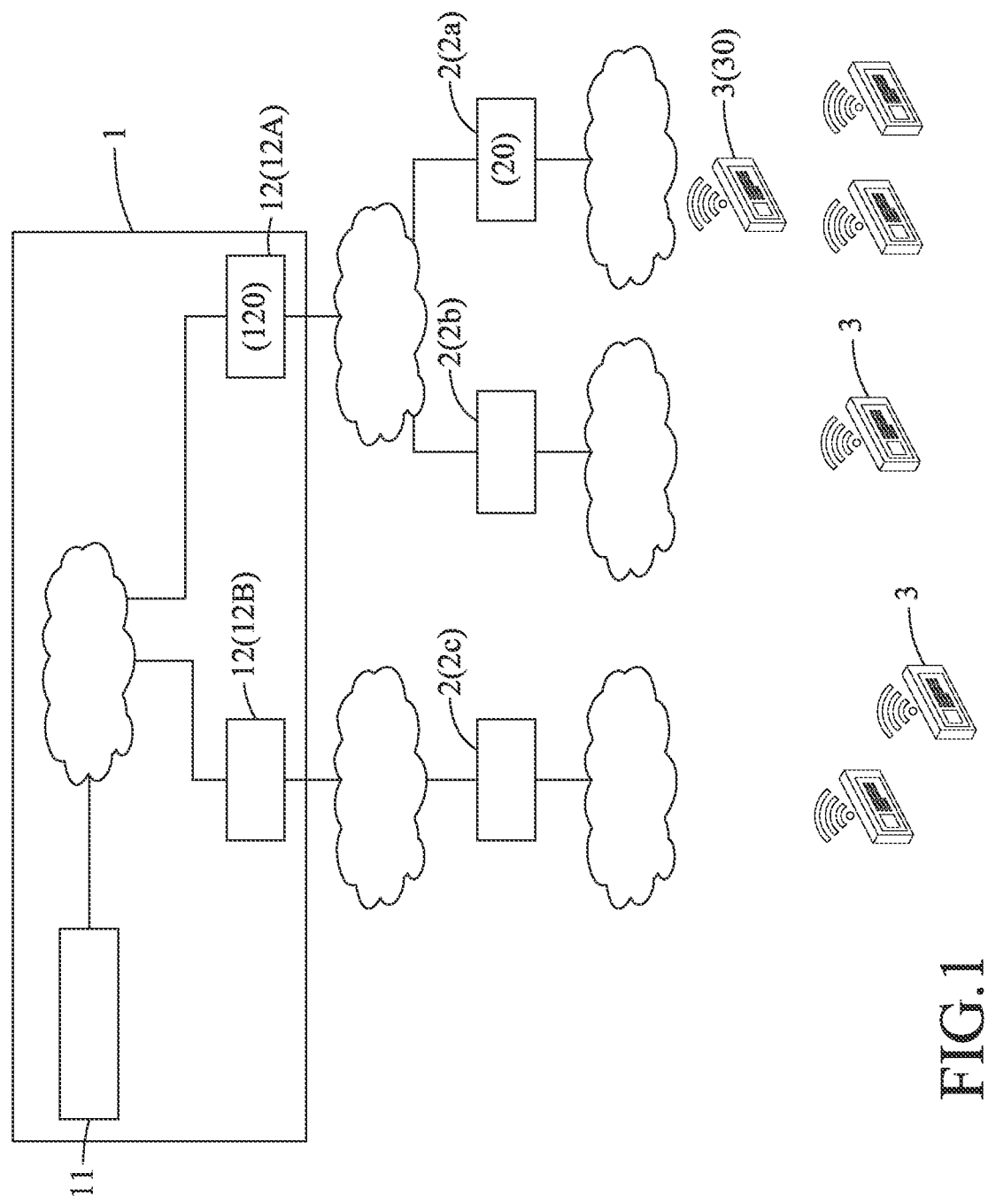

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a task dispatching method for electrophoretic display (EPD) tag devices 3 is implemented by a task dispatching system including a server system 1 and a plurality of routers 2 connected to the server system 1. The server system 1 manages and dispatches tasks to the EPD tag devices 3 via the routers 2.

In this embodiment, the server system 1 includes a main server 11 that is a higher level server, and a plurality of EPD servers 12 that are lower level servers connected to and managed by the main server 11. In another embodiment, the server system 1 may be a single large server that is configured to be connected to all of the routers 2, and performs the functions of managing and dispatching tasks to the EPD tag devices 3 via the routers 2.

The main server 11 may coordinate the tasks among these EPD servers 12, e.g., transferring one of the tasks from one of the EPD servers 12 to another one of the EPD servers 12. Each of the EPD servers 12 may be assigned to a specific area in a warehouse, and manage one or more of the routers 2 that are deployed within the area and that are connected to the EPD server 12 through a communication network. Each of the EPD servers 12 stores a connection list of its own, and handles commands received from the main server 11. The connection list is a record of the one or more of the routers 2 connected to the EPD server 12 and, for each of the one or more of the routers 2, the EPD tag device(s) 3 connected to the router 2.

Each of the EPD tag devices 3 may be mounted on a shelf or a container (not shown) where products are placed, and is connected to one of the routers 2 with the strongest signal over a wireless network. The EPD tag devices 3 record and display information according to the tasks received, and have functions such as flashing lights.

The main server 11 stores copies of the connection lists respectively of the EPD servers 12, and various commands that are inputted by clients (not shown). Each of the commands is exemplified as a task command hereinafter, and indicates a task and a target EPD tag device 30 that is one of the EPD tag devices 3 to which the task is assigned. As an example, the task may be "Action=Pick up, Product=A, Quantity=2," and the EPD tag device 3 that is mounted on the shelf or the container where products A are placed will be the target EPD tag device 30. Upon receiving the task, the target EPD tag device 30 displays relevant information and flashes.

Figure 2:
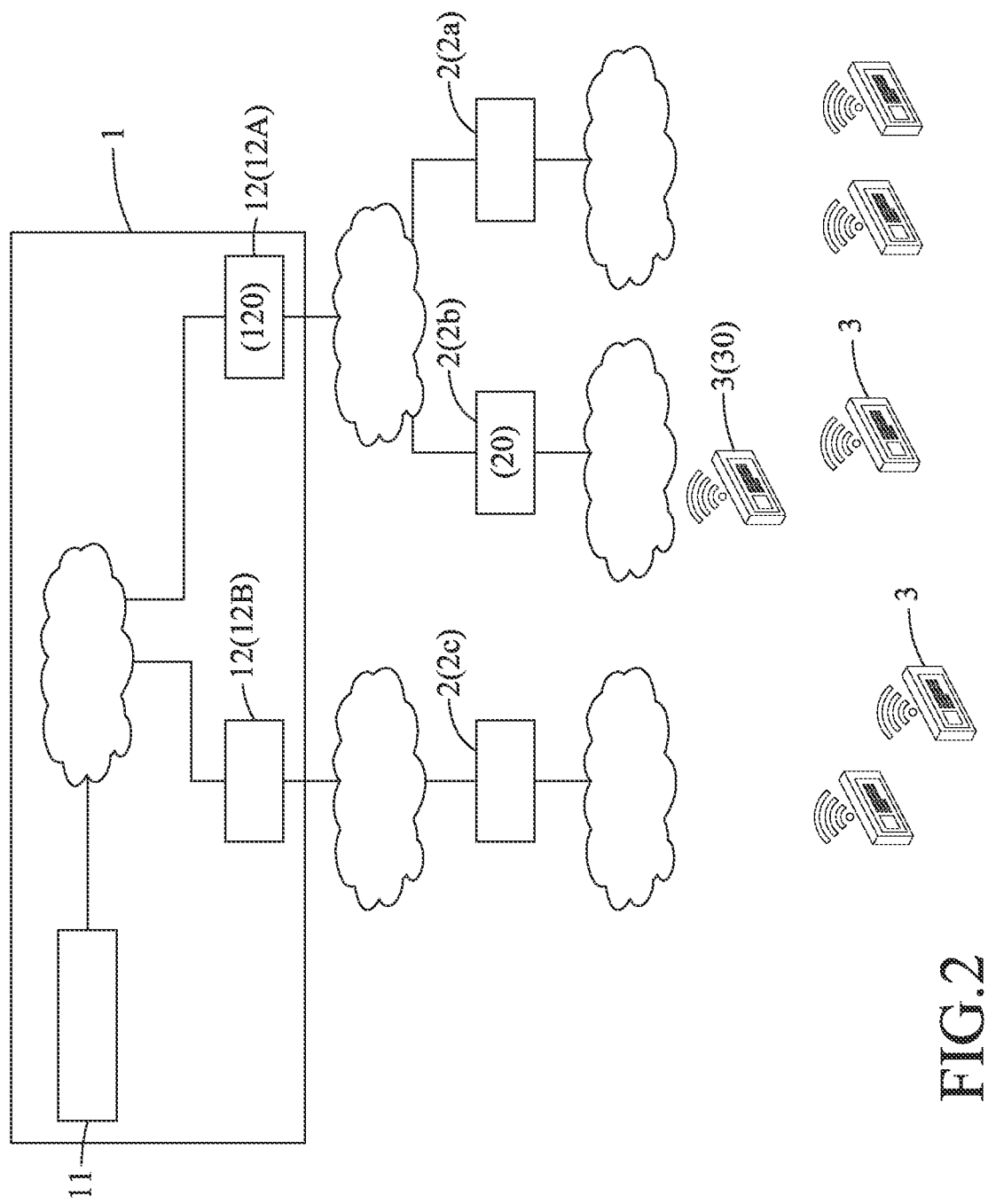
FIG. 2 is a block diagram of the task dispatching system for the EPD tag devices of FIG. 1, wherein the target EPD tag device has moved out of the coverage of the router 2a and is now connected to the router 2b.

Further referring to FIG. 2, sometimes, the shelf or the container may be moved to another area in the warehouse, bringing the target EPD tag device 30 along. In such case, the target EPD tag device 30 may no longer be within the coverage of the router 2 to which the target EPD tag device 30 was originally connected. The task dispatching method for the EPD tag devices 3 is capable of ensuring that the task is correctly dispatched and performed.

Figure 3:
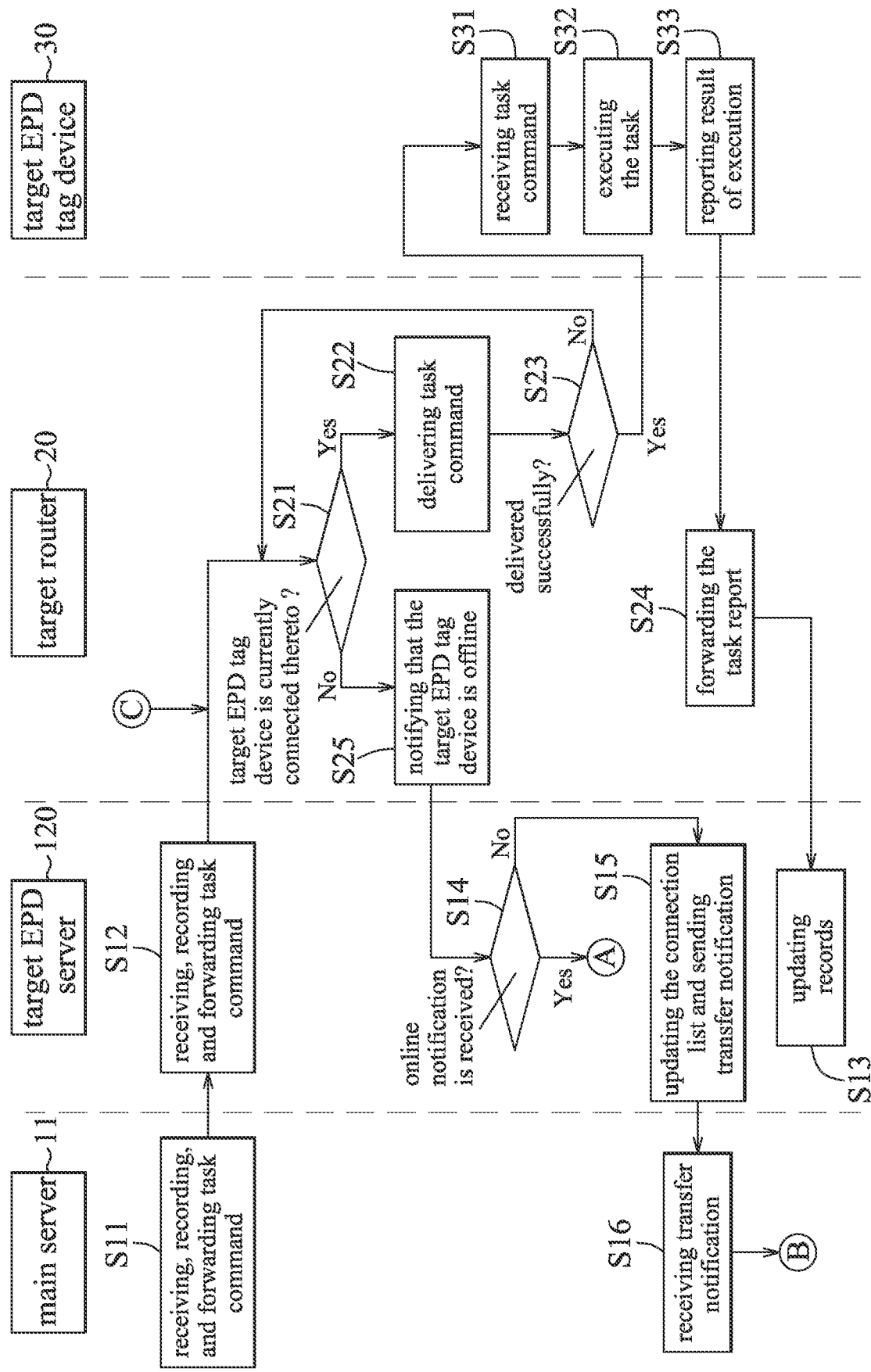
FIGS. 3-5 are flowcharts illustrating an embodiment of a task dispatching method for the EPD tag devices according to the disclosure.

Referring to FIG. 3, in this embodiment, the method includes the following steps.

In step S11, the main server 11 receives and records a task command that indicates a task and the target EPD tag device 30 that the task is assigned to.

Taking the configuration shown in FIG. 1 as an example, the EPD servers 12 include an EPD server 12A with routers 2a, 2b connected thereto, and an EPD server 12B with a router 2c connected thereto. The target EPD tag device 30 is connected to the router 2a. The copies of the connection lists of the EPD servers 12 stored in the main server 11 record these connections. With respect to the target EPD tag device 30, since the target EPD tag device 30 is connected to the router 2a and the router 2a is connected to the EPD server 12A, the EPD server 12A is identified as a target EPD server 120, and the router 2a is identified as a target router 20 by the main server 11. In this embodiment, the main server 11 further forwards this task command to the target EPD server 120 that is identified based on the copies of the connection lists of the EPD servers 12.

In step 12, the target EPD server 120 receives the task command from the main server 11, and records the task and the target EPD tag device 30 that the task is assigned to. The target EPD server 120 further forwards the task command to the target router 20 that is identified based on the connection list stored therein. The connection list of the EPD server 12A records the routers 2a, 2b that are connected thereto.

In step S21, the target router 20 checks whether the target EPD tag device 30 is currently connected thereto. When it is determined that the target EPD tag device 30 is currently connected to the target router 20, a flow of the method goes to step S22; otherwise, the flow goes to step S25.

In step S22, the target router 20 delivers the task command to the target EPD tag device 30.

In step S23, the target router 20 checks whether the task command is delivered successfully. Specifically, an acknowledgment-based protocol is used for delivery of the task command, in which the target router 20 repeatedly delivers the task command to the target EPD tag device 30 if the target EPD tag device does not acknowledge receipt of the task command. Based on this acknowledgment-based protocol, the target router 20 checks whether the task command is delivered successfully by determining whether a count of delivery exceeds a preset value. When it is determined that the count of delivery exceeds the preset value, it means that the task command is delivered unsuccessfully, and the flow goes back to step S21, i.e., the target router 20 once again checks whether the target EPD tag device 30 is currently connected thereto; when it is determined that the count of delivery does not exceed the preset value, it means that the task command is delivered successfully, and the flow goes to step S31.

In step S31, the target EPD tag device 30 receives the task command. In step S32, the target EPD tag device 30 executes the task indicated by the task command accordingly, e.g., displays information related to the task and flashes. In step S33, the target EPD tag device 30 reports a result of execution of the task to the target EPD server 120 via the target router 20. Specifically, in step S33, the target EPD tag device 30 sends a task report that is related to the result of execution of the task to the target router 20. In step S24, the target router 20 forwards the task report to the target EPD server 120.

In step S13, when the target EPD server 120 receives the task report, the target EPD server 120 updates its records about the task accordingly. For example, the records about the task may be stored in the target EPD server 120 and may be updated to indicate that the task has been completed. It is noted that, in step S12, whenever the task command is recorded in the target EPD server 120, the target EPD server 120 repeatedly checks whether the task has been completed. When it is determined that a count of results of checking indicating that the task is uncompleted exceeds a preset value, the target EPD server 120 forwards the task command to the target router 20 again, and the flow goes to S21, thus making another attempt on task command delivery.

Back to step S21, when it is determined that the target EPD tag device 30 is not currently connected to the target router 20, the flow goes to step S25. In step S25, the target router 20 notifies the target EPD server 120 that the target EPD tag device 30 is offline by sending an offline notification to the target EPD server 120.

In response to receiving the offline notification from the target router 20, in step S14, the target EPD server 120 determines whether an online notification that indicates that the target EPD tag device 30 is connected to another one of the routers 2 (referred to as another router 2 hereinafter) is received from the another router 2. When it is determined that an online notification is received from another router 2 that is connected to the target EPD server 120, it means that another processing flow has been triggered by the target EPD tag device 30, and the flow goes to step S43 (see 4); otherwise, it means that the target EPD server 120 is currently unable to handle the dispatch of the task, and the flow goes to step S15.

Figure 4:
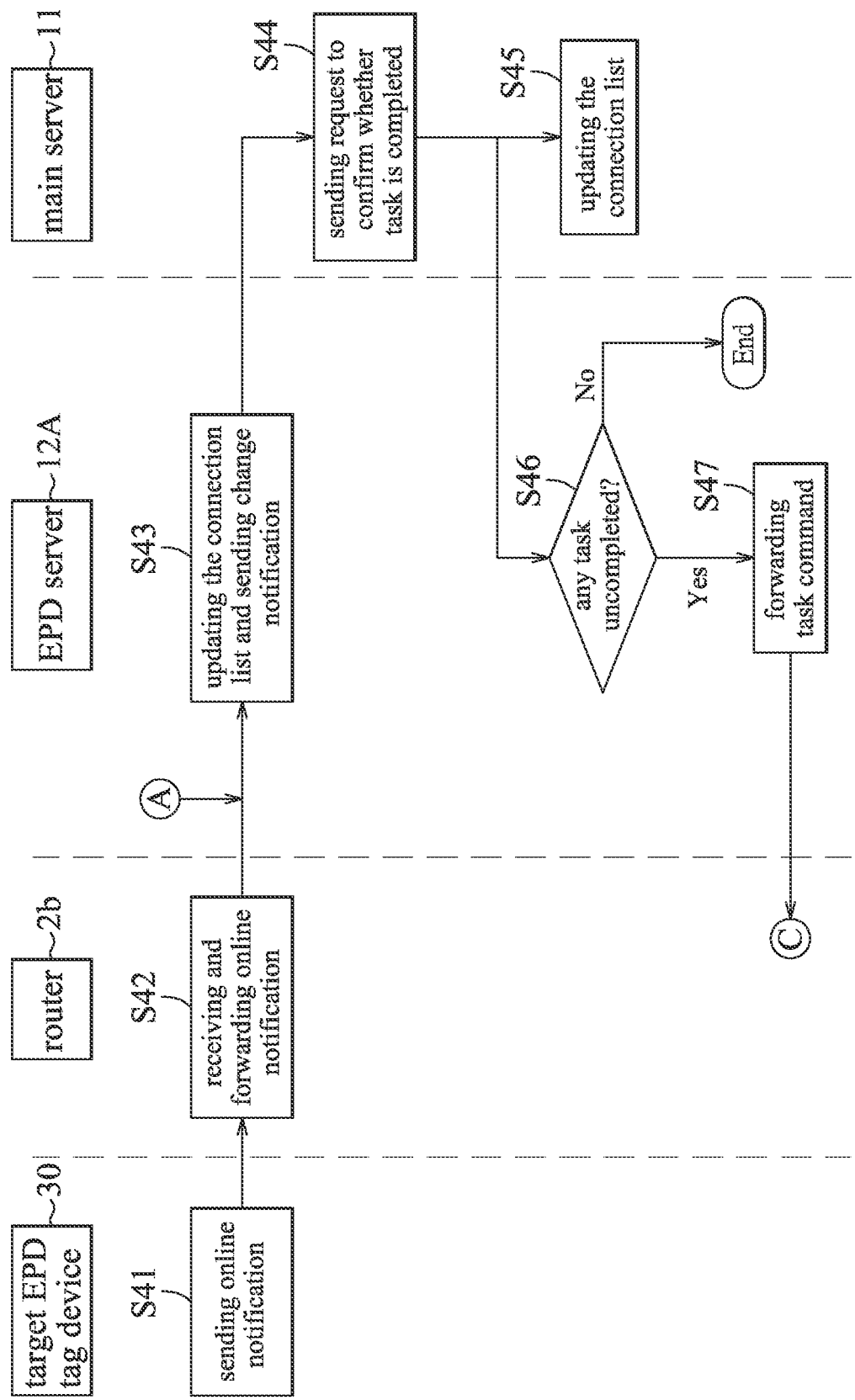

Further referring to FIGS. 2 and 4, in the case where the target EPD tag device 30 has been moved out of the coverage of the router 2a and into the coverage of the router 2b, said another processing flow will be triggered, i.e., in step S41, the target EPD tag device 30 is connected to the router 2b and sends an online notification that indicates the target EPD tag device 30 being connected to the router 2b. In step S42, the router 2b receives the online notification and forwards the same to the EPD server 12 to which the router 2b is connected, i.e., the EPD server 12A.

After receiving the online notification, in step S43, the EPD server 12A updates the connection list of its own accordingly. The connection list thus updated records that the target EPD tag device 30 is connected to the router 2b, rather than to the router 2a. The EPD server 12A further sends a change notification for reporting this change to the main server 11 by sending a copy of the updated connection list of its own or by forwarding the online notification. In response to receiving the change notification, in step S44, the main server 11 sends a request to the current target EPD server 120, which is the EPD server 12A, requesting the current target EPD server 120 to confirm whether there is any task that is assigned to the target EPD tag device 30 that has not yet been completed (hereinafter "uncompleted task"). In step S45, the main server 11 updates the copies of the connection lists of the EPD servers 12 stored therein based on the change notification.

In response to receiving the request, in step S46, the EPD server 12A determines whether there is any uncompleted task by checking the records about the task stored therein. According to the example disclosed earlier, when the flow proceeds from step S11, through steps S25 and S43 to step S46, it means that the task has not yet been dispatched to the target EPD tag device 30 and is uncompleted, so "yes" would be determined in this step, and the flow would then go to step S47. It is noted that, since the router 2 to which the target EPD tag device 30 is connected has been changed and the connection lists have been updated in steps S43 and S45, the router 2b is now identified, by the main server 11 and the target EPD server 120, as the target router 20. In step S47, the EPD server 12A forwards the task command to the target router 20, which is identified as the router 2b based on the connection list stored therein, and the flow goes to step S21. In this way, when the flow goes back to step S21, the task command may be delivered to the target EPD tag device 30 successfully.

On the other hand, the aforementioned steps S41 to S47 in the flowchart of FIG. 4 may be implemented irrespective of whether steps S25 and S14 in FIG. 3 are performed, and may even be implemented without any task command being inputted by clients (namely, step S11 is not performed). In other words, in a scenario where the target EPD tag device 30 is moved out of the coverage of the router 2a (see FIG. 1) and into the coverage of the router 2b (see FIG. 2) after the task command has been delivered to the target router 20 ("yes" in step S23) and the task has been executed by the target EPD tag device 30 in step S32, steps S41 to S46 in the flowchart of FIG. 4 will still be performed. Therefore, the task that is related to the determination to be made in step S46 may have been previously dispatched to the target EPD tag device 30 and may have been completed. Should the task have been completed, then in step S46, "no" would be determined, and no further action would need to be performed.

Figure 6:
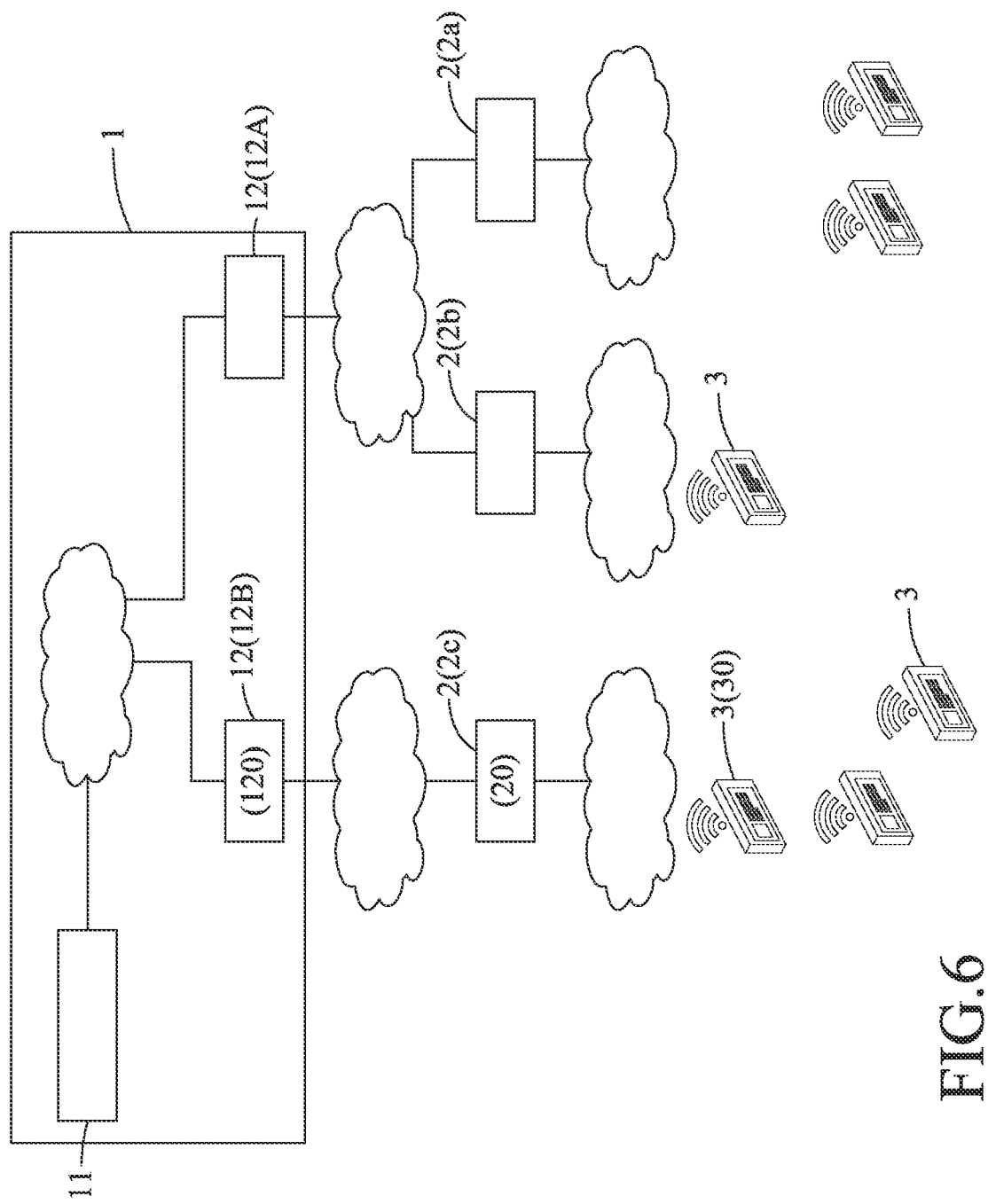
FIG. 6 is a block diagram of the task dispatching system for the EPD tag devices of FIG. 1, wherein the target EPD tag device has moved out of the coverage of the router 2b and is now connected to the router 2c.

Referring to FIG. 6, when the target EPD tag device 30 is moved out of the coverage of the routers 2a, 2b that are deployed under the EPD server 12A (that is, the target EPD server 120) and into the coverage of the router 2c, the target EPD server 120 is unable to handle the dispatch of the task. This is the case when a result of the determination as to whether an online notification is received from another router 2 in step S14 of FIG. 3 is negative.

In step S15, the target EPD server 120 updates the connection list of its own, and by sending a transfer notification to the main server 11, notifies the main server 11 that delivery of the task command is to be transferred. The connection list of the target EPD server 120 thus updated records that the target EPD tag device 30 is not connected to the routers 2a, 2b.

In step S16, the main server 11 receives the transfer notification.

Figure 5:
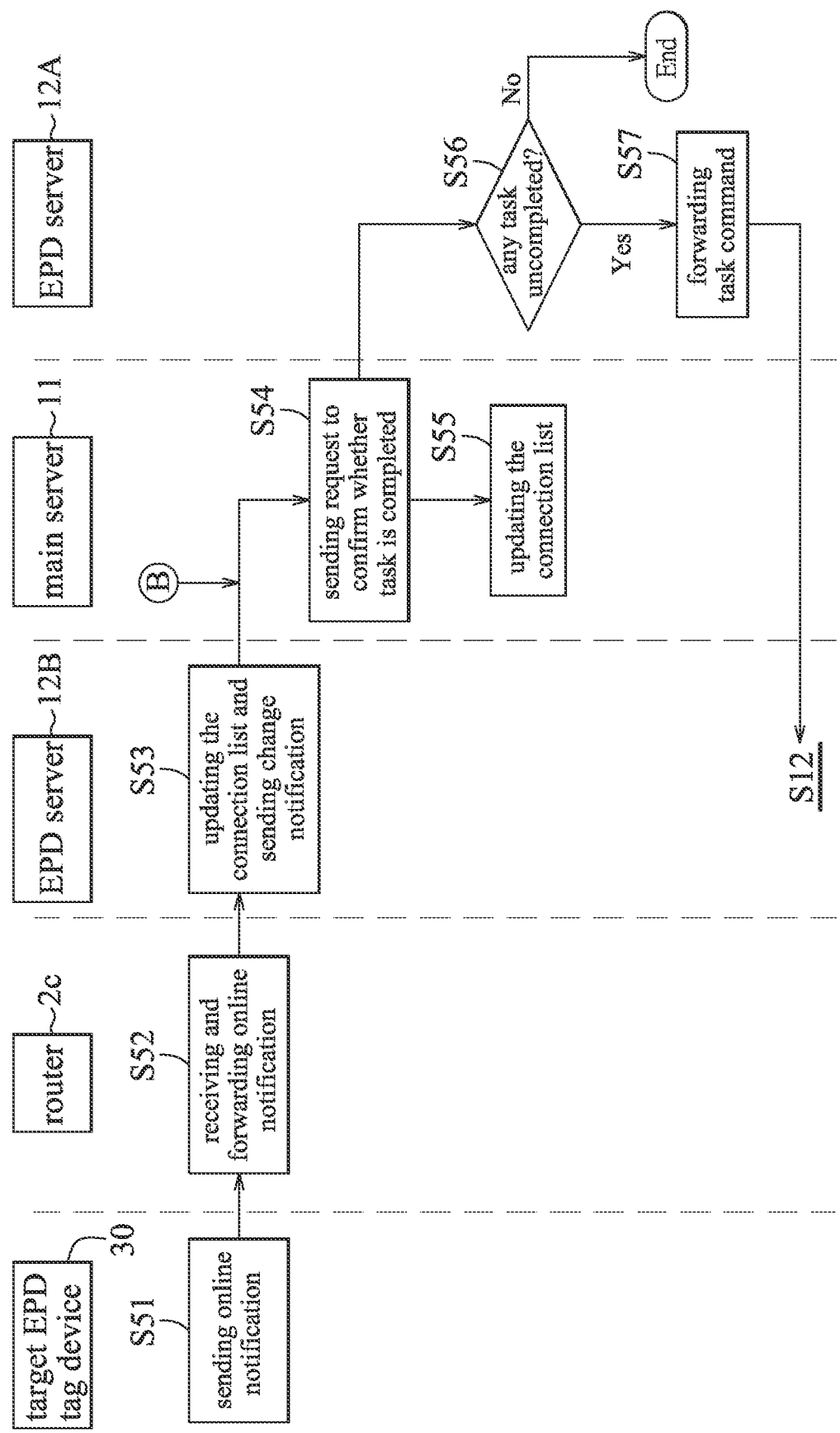

Referring to FIGS. 5 and 6, in the case where the target EPD tag device 30 is moved into the coverage of the router 2c, in step S51, the target EPD tag device 30 is connected to the router 2c and sends an online notification indicating that the target EPD tag device 30 is connected to the router 2c. In step S52, the router 2c receives the online notification and forwards the same to the EPD server 12 to which the router 2c is connected, i.e., the EPD server 12B.

After receiving the online notification, in step S53, the EPD server 12B updates the connection list of its own accordingly. The connection list thus updated records that the target EPD tag device 30 is connected to the router 2c. The EPD server 12B further sends a change notification for reporting this change to the main server 11 by sending a copy of the updated connection list of its own or by forwarding the online notification. In response to receiving the change notification from the EPD server 12B, in step S54, the main server 11 sends a request to the current target EPD server 120, which is the EPD server 12A, requesting the EPD server 12A to confirm whether there is any task that is assigned to the target EPD tag device 30 that has not been completed yet. In step S55, the main server 11 updates the copies of the connection lists stored therein accordingly. It is noted that, since the router 2 to which the target EPD tag device 30 is connected has changed and the connection lists have been updated in steps S53 and S55, the router 2c is now identified as the target router 20 and the EPD server 12B is now identified as the target EPD server 120 (see FIG. 5).

In response to receiving the request, in step S56, the EPD server 12A determines whether there is any task that is assigned to the target EPD tag device 30 has not been completed by checking the records about the task stored therein. Moreover, in a case where the main server 11 has received the transfer notification from the current target EPD server 120 (see step S16 in FIG. 3), the main server 11, in step S56, further sends a target transfer signal to the EPD server 12A to notify that the task command is to be transferred to the EPD server 12B (i.e., the new target EPD server 120). In the case where the flow proceeds from step S11, through steps S25 and S15 to step S56, it means that the task has not yet been dispatched to the target EPD tag device 30 and is thus uncompleted, so "yes" would be determined in this step, and the flow would then proceed to step S57. In step S57, the EPD server 12A forwards or transfers, according to the target transfer signal, the task command to the (new) target EPD server 120, which is the EPD server 12B. Then, the flow goes back to step S12, and the task command may be delivered to the target EPD tag device 30 successfully.

On the other hand, the aforementioned steps S51 to S56 in the flowchart of FIG. 5 may be implemented irrespective of whether steps S25, S14, S15 and S16 in FIG. 3 are performed. In other words, in a scenario where the target EPD tag device 30 is moved into the coverage of the router 2c (see FIG. 5) after the task command has been delivered to the target router 20 ("yes" in step S23) and the task has been executed by the target EPD tag device 30 in step S32, steps S51 to S57 in the flowchart of FIG. 5 will still be performed. Therefore, the task related to the determination to be made in step S56 may have been previously dispatched to the target EPD tag device 30 and may have been completed. Should the task have been completed, then in step S56, "no" would be determined and no further action would need to be performed.

In summary, the task dispatching method for the EPD tag devices of this disclosure realizes task dispatching by making the target EPD server 120 forward the task command to the target router 20, which determines whether the target EPD tag device 30 is "online" (connected to the target router 20) and notifies the target EPD server 120 when determining that the target EPD tag device 30 is "offline," by making the target EPD server 120 forward the task command to another router 2 when the target EPD server 120 receives an online notification from the another router 2, and by making the target EPD server 120 transfer the task command to another EPD server 12 when the target EPD server 120 does not receive an online notification from another router 2.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A task dispatching method for a plurality of electrophoretic display (EPD) tag devices to be implemented by a server system and a plurality of routers connected to the server system, each of the plurality of EPD tag devices configured to be connected to a router of the plurality of routers over a wireless network, the method comprising steps of:
    a) receiving, by the server system, an input comprising a task command, the task command comprising a task and a target EPD tag device of the plurality of EPD tag devices that the task is assigned to;
    b) forwarding, by the server system, the task command to a target router of the plurality of routers that the target EPD tag device is connected to, wherein the target router is identified based on a connection list stored in the server system, wherein the connection list records at least one of the plurality of routers and one or more of the plurality of EPD tag devices connected to the at least one of the plurality of routers;
    c) checking, by the target router, whether the target EPD tag device is currently connected thereto;
    d) sending, by the target router, an offline notification to the server system, the offline notification indicating that the target EPD tag device is offline based on determining that the target EPD tag device is not currently connected to the target router;
    e) receiving, by the server system, an online notification from a second target router of the plurality of routers, the online notification indicating that the target EPD tag device is connected to the second target router;
    f) in response to receiving the offline notification and the online notification, updating, by the server system, the connection list based on the offline notification and the online notification to provide an updated connection list, identifying that the target EPD device is currently connected to the second target router;
    g) forwarding, by the server system, the task command to the second target router based on the updated connection list;

h) checking, by the second target router, whether the target EPD tag device is currently connected thereto; and i) delivering, by the second target router, the task command to the target EPD tag device when it is determined that the target EPD tag device is currently connected thereto.

2. The method as claimed in claim 1, the server system comprising a main server and a plurality of EPD servers connected to and managed by the main server, each of the plurality of EPD servers having at least one target router of the plurality of target routers connected thereto; wherein step b) comprises:

b1) forwarding, by the main server, the task command to a target EPD server of the plurality of EPD servers that the target router is connected to; and b2) forwarding, by the target EPD server, the task command to the target router.

3. The method of claim 2, wherein each of the plurality of EPD servers stores a respective connection list;

wherein the main server stores a copy of each respective connection list;

wherein in step b1), the main server forwards the task command to the target EPD server that is identified based on the copies of each respective connection list stored in the main server; and wherein in step b2), the target EPD server forwards the task command to the target router that is identified based on the respective connection list stored in the target EPD server.

4. The method of claim 2, wherein the target EPD server receives the offline notification from the target router;

wherein the target EPD server receives the online notification from the second target router; and wherein the target EPD server updates the connection list thereof based on the offline notification and the online notification, and identifies that the second target EPD device is currently connected to the second target router.

5. The method of claim 4, further comprising:

in a case where the online notification is not received, sending, by the EPD server, a transfer notification to the main server, the transfer notification indicating that the task is to be transferred.

6. The method of claim 5, further comprising:

receiving, by the main server, the transfer notification;

receiving, by the main server from a second target EPD server of the plurality of target EPD servers, a change notification indicating that the target EPD tag device is connected to the second target router which is connected to the second target EPD server.

7. The method of claim 1, further comprising:

determining, by the target router, whether the task command is delivered successfully, and when it is determined that the task command is delivered unsuccessfully, repeating step c).

8. The method of in claim 1, wherein step a) further comprises recording the task command, the method further comprising:

repeatedly checking, by the server system, whether the task has been completed, and when it is determined that a count of results of checking indicating that the task is incomplete exceeds a preset value, repeating step b).

9. A task dispatching method for a plurality of electrophoretic display (EPD) tag devices to be implemented by a main server, a plurality of EPD servers connected to and managed by the main server, and a plurality of routers connected to the plurality of EPD servers, each of the plurality of EPD tag devices configured to be connected to one of the routers of the plurality of routers over a wireless network, the method comprising:

storing, by each of the EPD servers, a connection list comprising a record of at least one of the plurality of the routers connected thereto and one or more of the plurality of EPD tag devices connected to the at least one of the plurality of routers;

receiving, by a second target router of the plurality of routers, an online notification that indicates that a target EPD tag device of the plurality of EPD tag devices that is originally connected to a first target router of the plurality of routers is connected to the second target router of the plurality of routers;

forwarding, by the second target router, the online notification to a target EPD server of the plurality of EPD servers which the second target router is connected to;

updating, by the target EPD server, the connection list based on the online notification so the record of the connection list is changed to reflect that the target EPD tag device is connected to the second target router;

sending, by the target EPD server, a change notification for reporting this change to the main server;

in response to receiving the change notification, sending a request, by the main server, to the first target EPD server which the first target router of the plurality of routers is connected to request confirmation on whether there is any task that is assigned to the target EPD tag device that has not been completed yet; and when it is determined that there is a task that is assigned to the target EPD tag device that has not been completed yet, forwarding, by the first target EPD server which the first target router is connected to, a command related to the task that has not been completed to the second target EPD server which the second target router is connected to.

10. A task dispatching system comprising:

a server system having at least one connection list stored therein; and a plurality of routers connected to said server system;

wherein each of the plurality of routers is connected to one or more electrophoretic display (EPD) tag devices of a plurality of EPD tag devices;

wherein each of the at least one connection list records at least one router of the plurality of routers and one or more of the plurality of EPD tag devices connected to the at least one of the plurality of routers;

wherein said server system and said routers are configured to perform the method of claim 1.

* * * * *